(12) United States Patent
Kim et al.

(10) Patent No.: US 10,898,837 B2
(45) Date of Patent: Jan. 26, 2021

(54) STERILIZATION WATER DISCHARGE DEVICE AND WATER TREATMENT DEVICE INCLUDING SAME

(71) Applicant: COWAY CO., LTD., Chungcheongnam-do (KR)

(72) Inventors: Jae-Man Kim, Seoul (KR); In-Du Choi, Seoul (KR); Woo-Jin Kang, Seoul (KR); Do-Han Kim, Seoul (KR); Jin-Woo Choi, Seoul (KR); Byung-Hyo Ye, Seoul (KR)

(73) Assignee: Coway Co., Ltd

( * ) Notice: Subject to any disclaimer, the term of this patent is extended or adjusted under 35 U.S.C. 154(b) by 91 days.

(21) Appl. No.: 16/098,332

(22) PCT Filed: May 2, 2017

(86) PCT No.: PCT/KR2017/004685
§ 371 (c)(1),
(2) Date: Nov. 1, 2018

(87) PCT Pub. No.: WO2017/192002
PCT Pub. Date: Nov. 9, 2017

(65) Prior Publication Data
US 2019/0118123 A1  Apr. 25, 2019

(30) Foreign Application Priority Data
May 2, 2016 (KR) .......................... 10-2016-0053832

(51) Int. Cl.
*B01D 29/92* (2006.01)
*B01D 35/16* (2006.01)
(Continued)

(52) U.S. Cl.
CPC ............. *B01D 29/92* (2013.01); *B01D 35/04* (2013.01); *B01D 35/14* (2013.01); *B01D 35/147* (2013.01);
(Continued)

(58) Field of Classification Search
None
See application file for complete search history.

(56) References Cited

U.S. PATENT DOCUMENTS

| 5,819,784 A | 10/1998 | Yoon |
| 7,404,356 B2 * | 7/2008 | Viaud .................... A01F 15/07 |
| | | 100/87 |

(Continued)

FOREIGN PATENT DOCUMENTS

| CN | 101088439 | 12/2007 |
| CN | 101822921 | 9/2010 |

(Continued)

OTHER PUBLICATIONS

European Search Report dated Mar. 6, 2019 issued in counterpart application No. 17792904.9-1101, 8 pages.
(Continued)

*Primary Examiner* — Chester T Barry
(74) *Attorney, Agent, or Firm* — The Farrell Law Firm, P.C.

(57) ABSTRACT

A sterilization water discharge device is disclosed. A sterilization water discharge device includes: a tray part, which is movably disposed under a discharge member for discharging water and allows sterilization water discharged from the discharge member to be received therein and discharged; and a movement driving part for moving the tray part.

15 Claims, 11 Drawing Sheets

(51) Int. Cl.
*C02F 1/00* (2006.01)
*C02F 1/44* (2006.01)
*B01D 35/14* (2006.01)
*B01D 61/02* (2006.01)
*B01D 35/04* (2006.01)
*B01D 35/157* (2006.01)
*B01D 35/18* (2006.01)
*B01D 35/147* (2006.01)
*B67D 1/07* (2006.01)
*B01D 61/08* (2006.01)
*B01D 61/10* (2006.01)
*C02F 1/46* (2006.01)

(52) U.S. Cl.
CPC ....... *B01D 35/157* (2013.01); *B01D 35/1573* (2013.01); *B01D 35/16* (2013.01); *B01D 35/18* (2013.01); *B01D 61/02* (2013.01); *B01D 61/025* (2013.01); *B01D 61/08* (2013.01); *B01D 61/10* (2013.01); *B67D 1/07* (2013.01); *C02F 1/003* (2013.01); *C02F 1/441* (2013.01); *B01D 2201/167* (2013.01); *B01D 2311/2649* (2013.01); *B01D 2311/2692* (2013.01); *B01D 2313/12* (2013.01); *B01D 2313/18* (2013.01); *B01D 2313/22* (2013.01); *B01D 2313/50* (2013.01); *C02F 1/46* (2013.01); *C02F 2201/002* (2013.01); *C02F 2303/04* (2013.01); *C02F 2307/10* (2013.01)

(56) References Cited

U.S. PATENT DOCUMENTS

2008/0190132 A1* 8/2008 Voglewede ............ F25D 23/126
62/389
2008/0202996 A1* 8/2008 Oranski ............... B67D 1/0895
210/143
2014/0230481 A1 8/2014 Yun et al.

FOREIGN PATENT DOCUMENTS

| CN | 203399999 | 1/2014 |
| CN | 103994624 | 8/2014 |
| CN | 204813415 | 12/2015 |
| KR | 100161071 | 8/1998 |
| KR | 2019990016970 | 5/1999 |
| KR | 1020110061341 | 6/2011 |
| KR | 1020110127595 | 11/2011 |
| WO | WO 2011/145902 | 11/2011 |

OTHER PUBLICATIONS

PCT/ISA/210 Search Report issued on PCT/KR2017/004685 pp. 5.
PCT/ISA/237 Written Opinion issued on PCT/KR2017/004685 pp. 7.
Chinese Office Action dated Jul. 21, 2020 issued in counterpart application No. 201780027188.0, 9 pages.

* cited by examiner

【Figure 1】
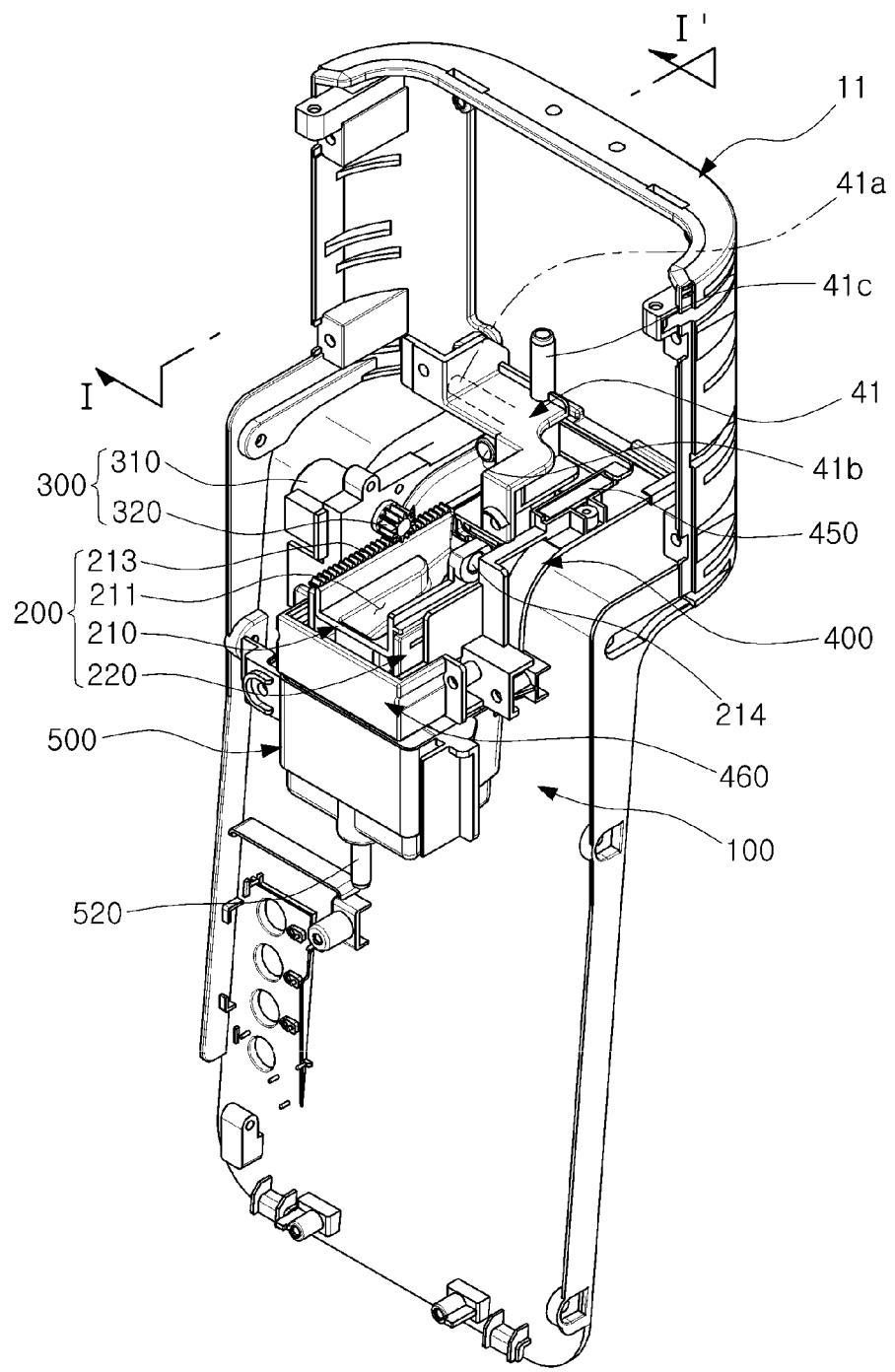

[Figure 2]
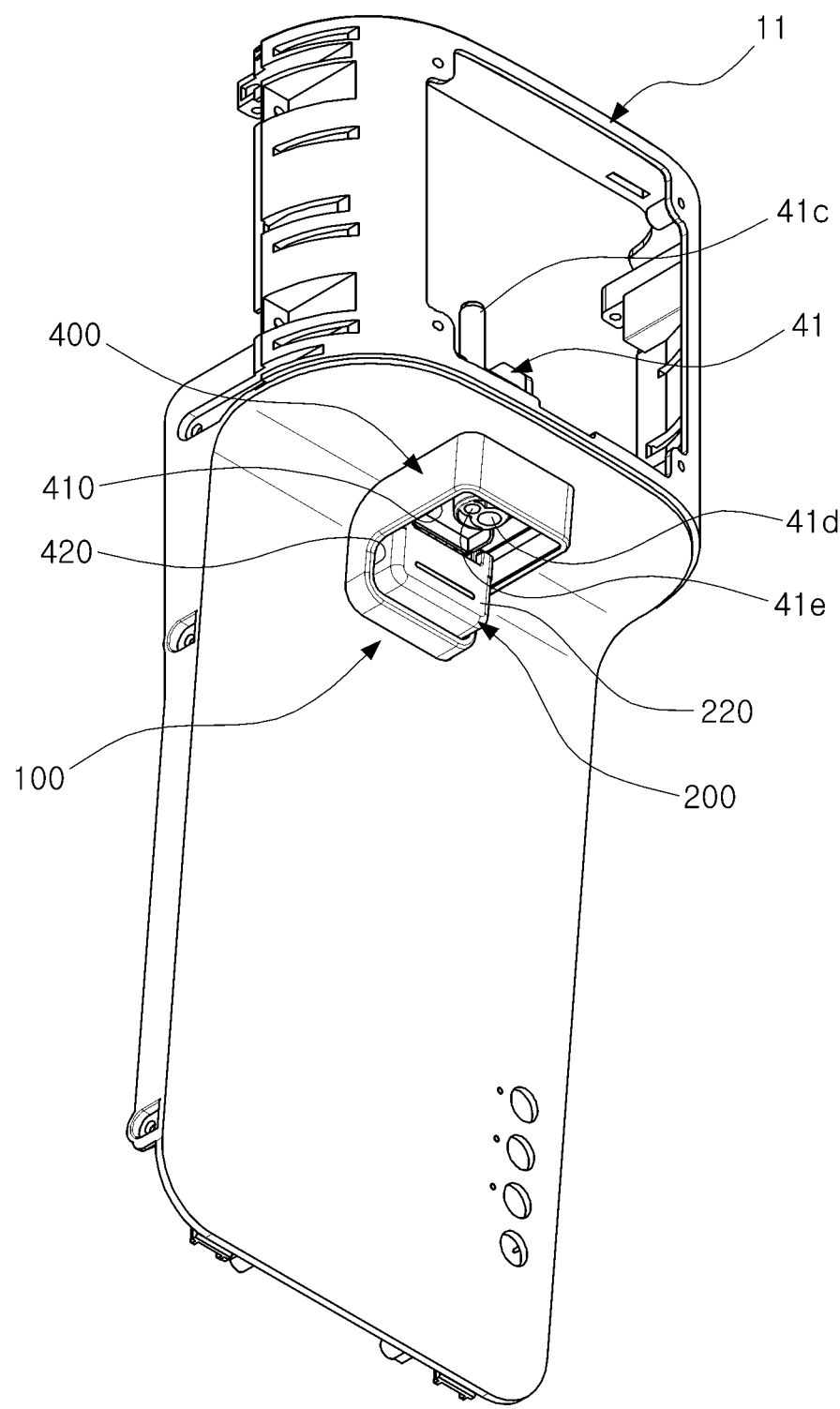

【Figure 3】
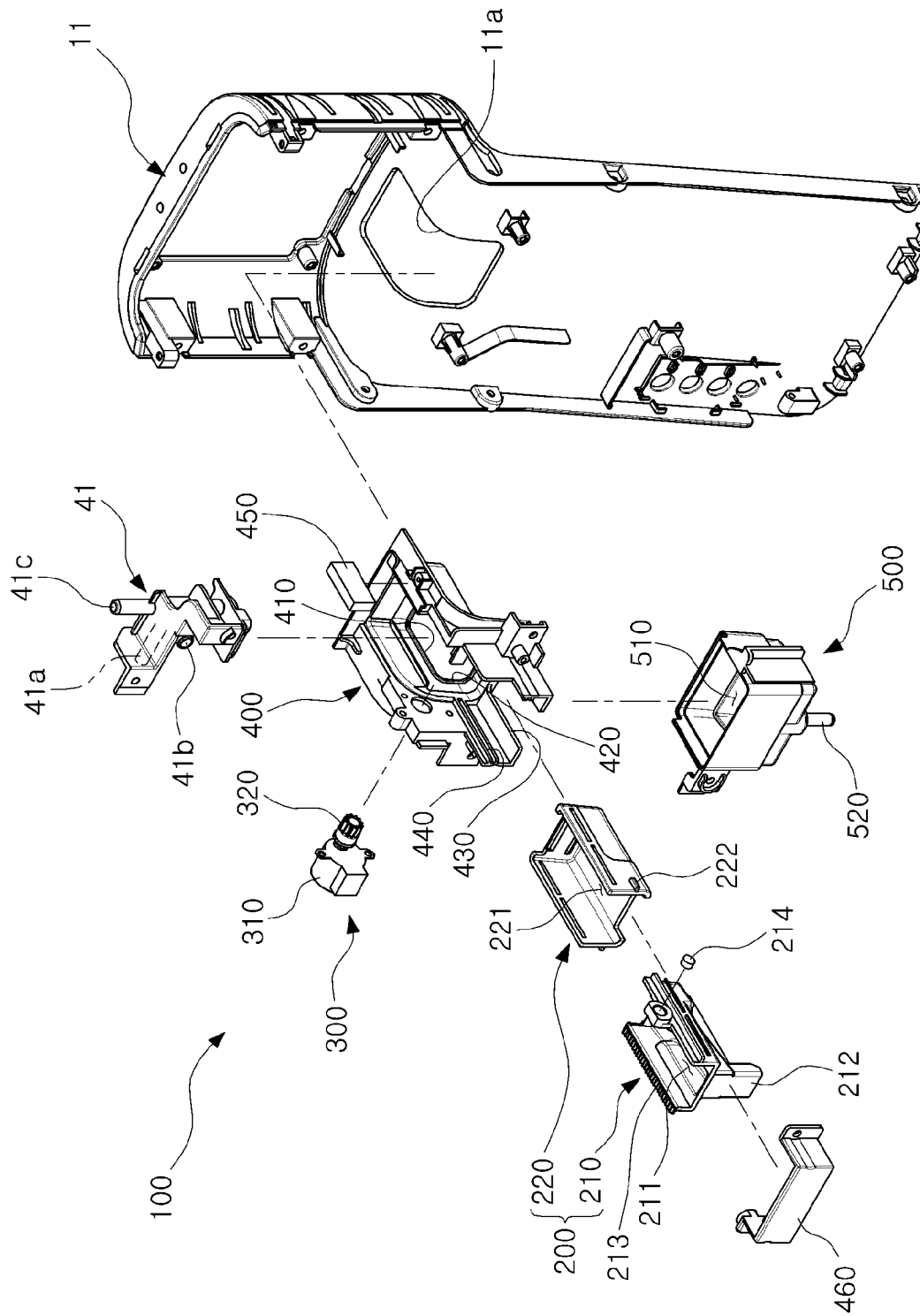

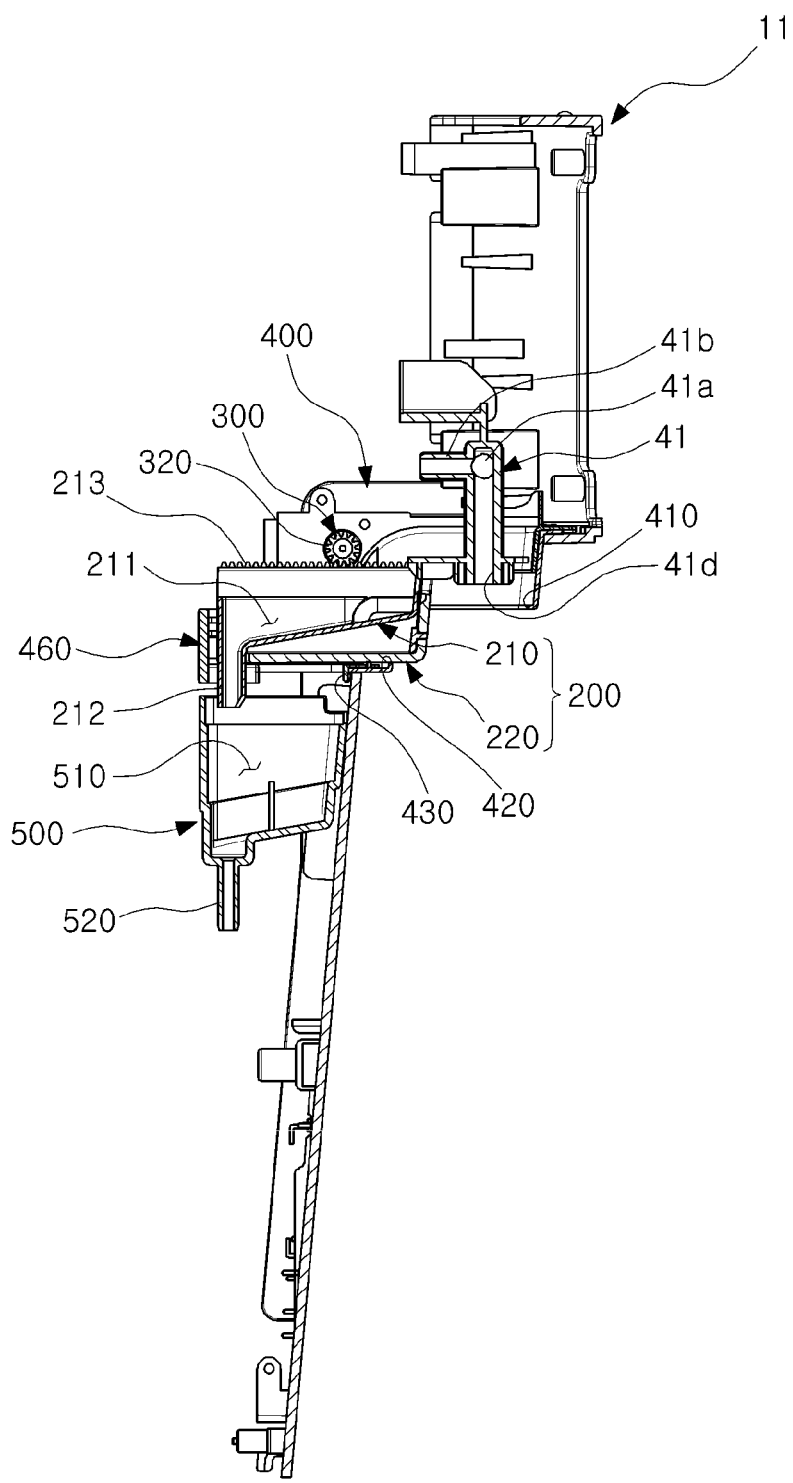
[Figure 4]

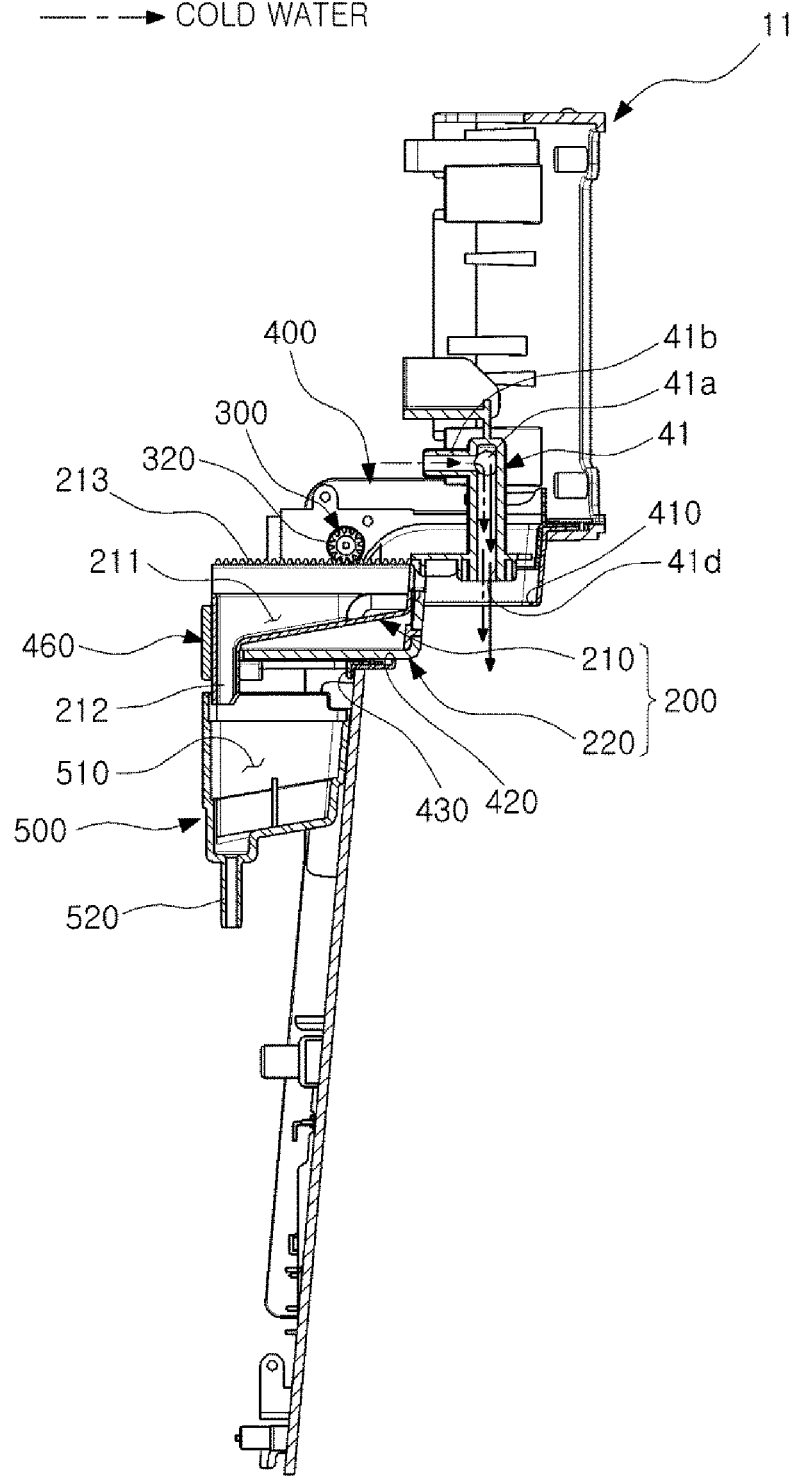

【Figure 6】
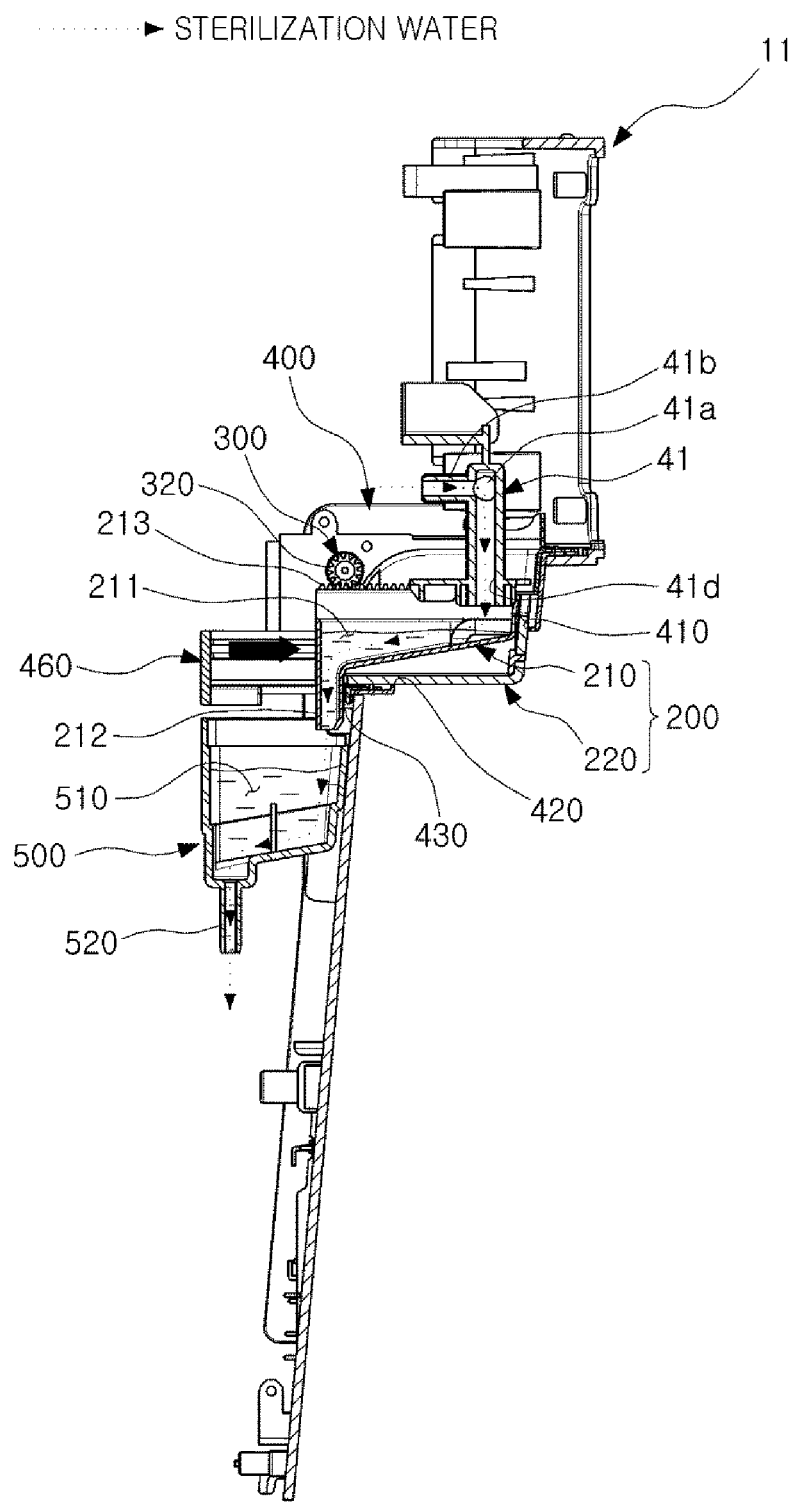

[Figure 7]
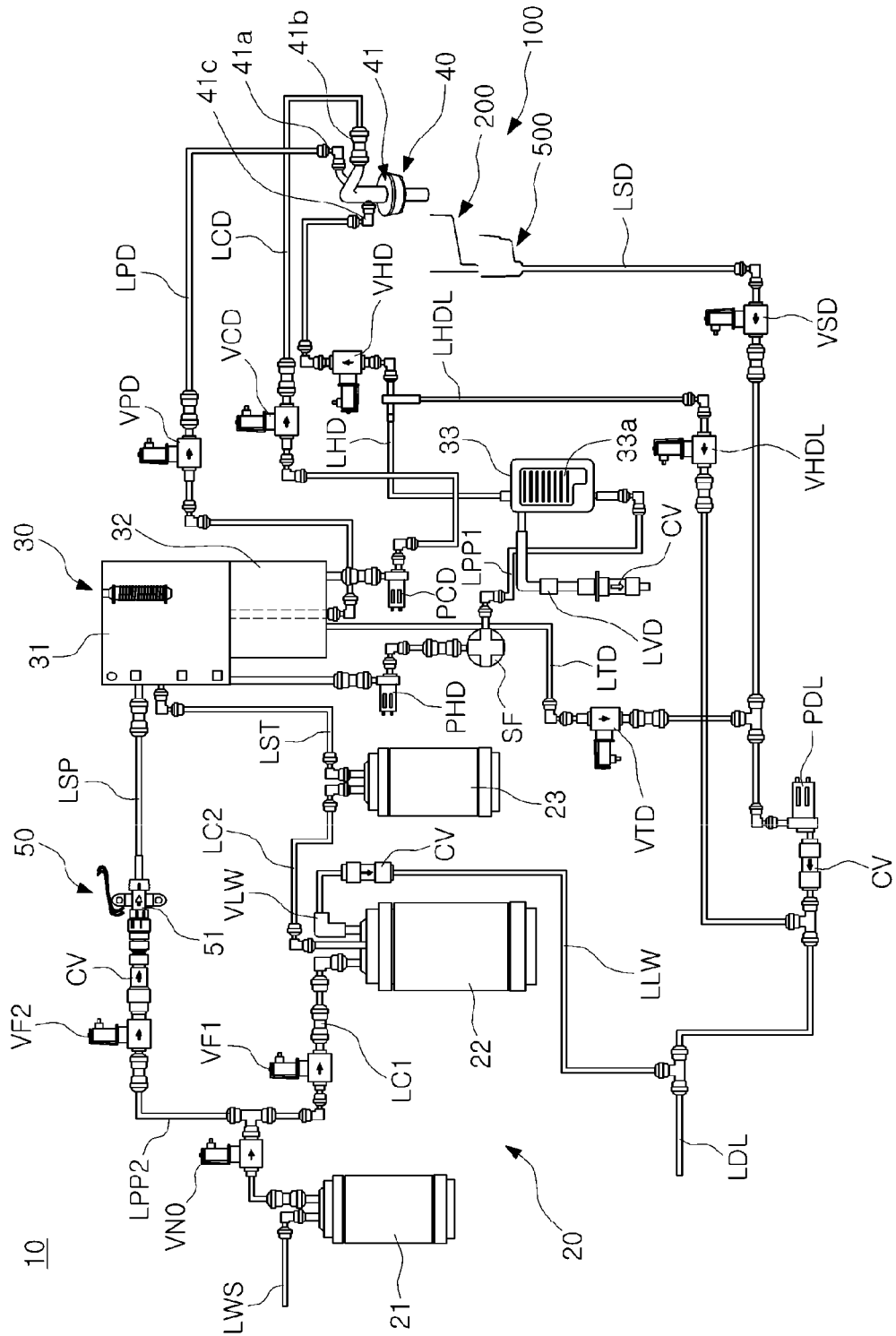

【Figure 8】
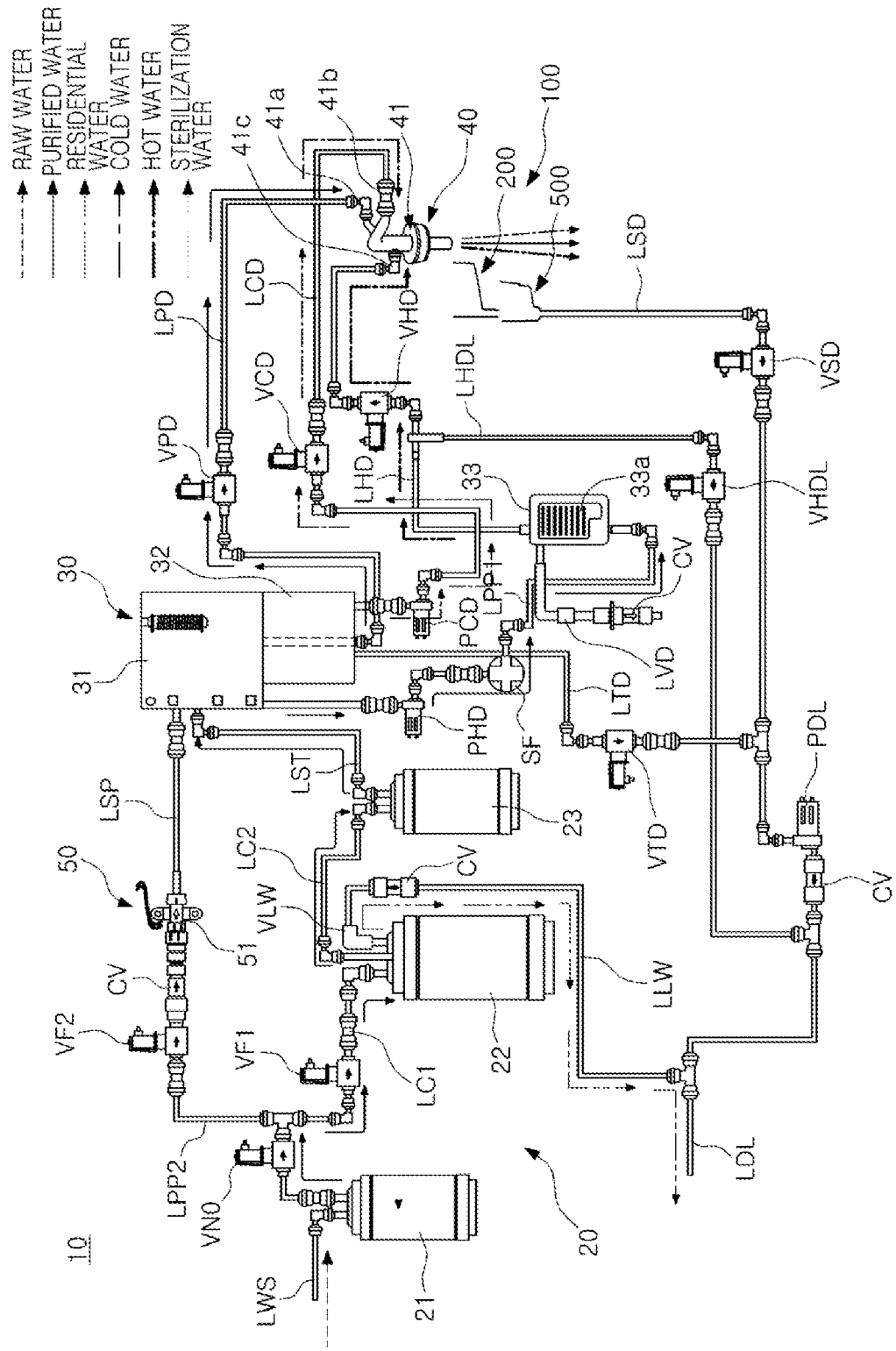

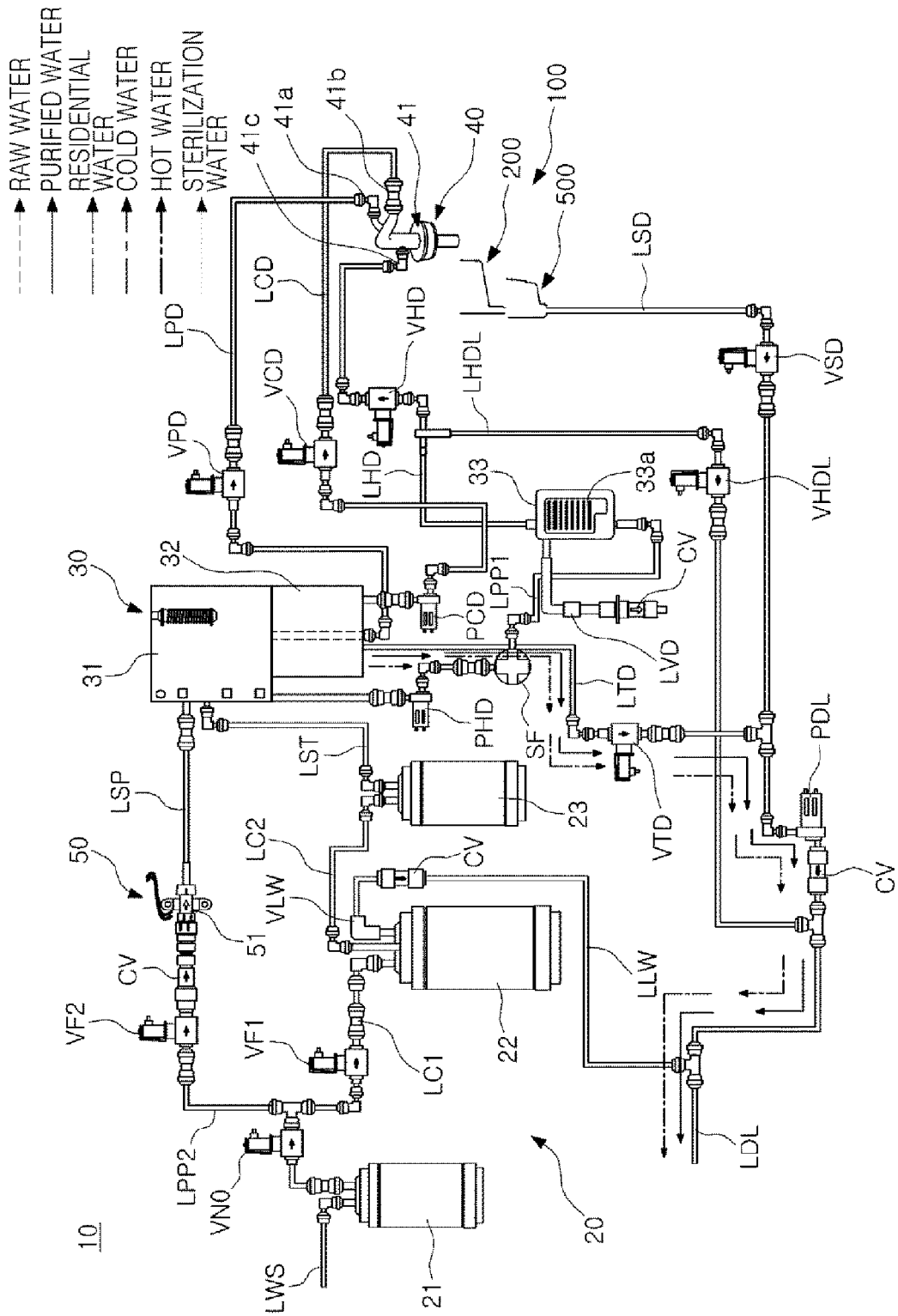
[Figure 9]

[Figure 10]
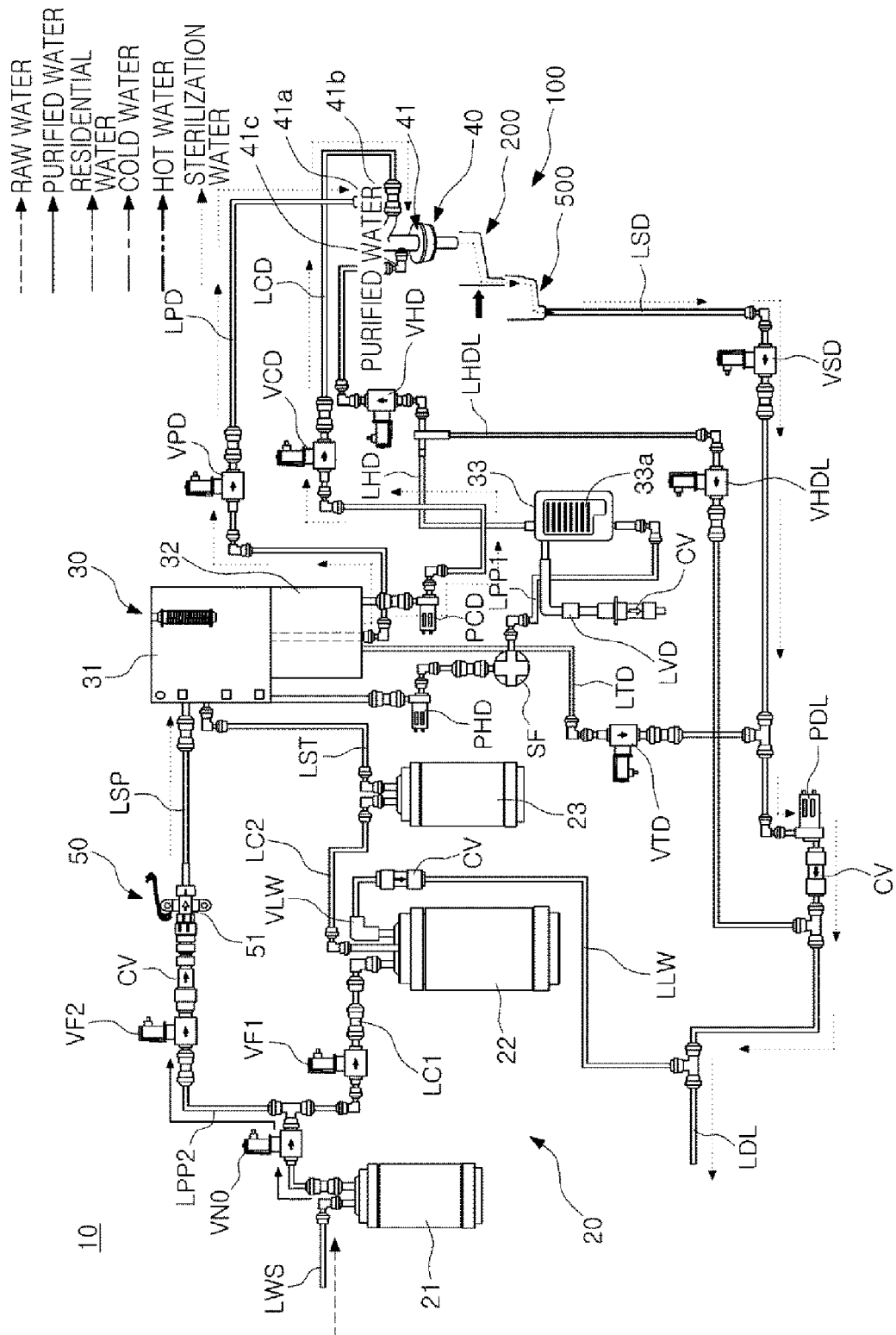

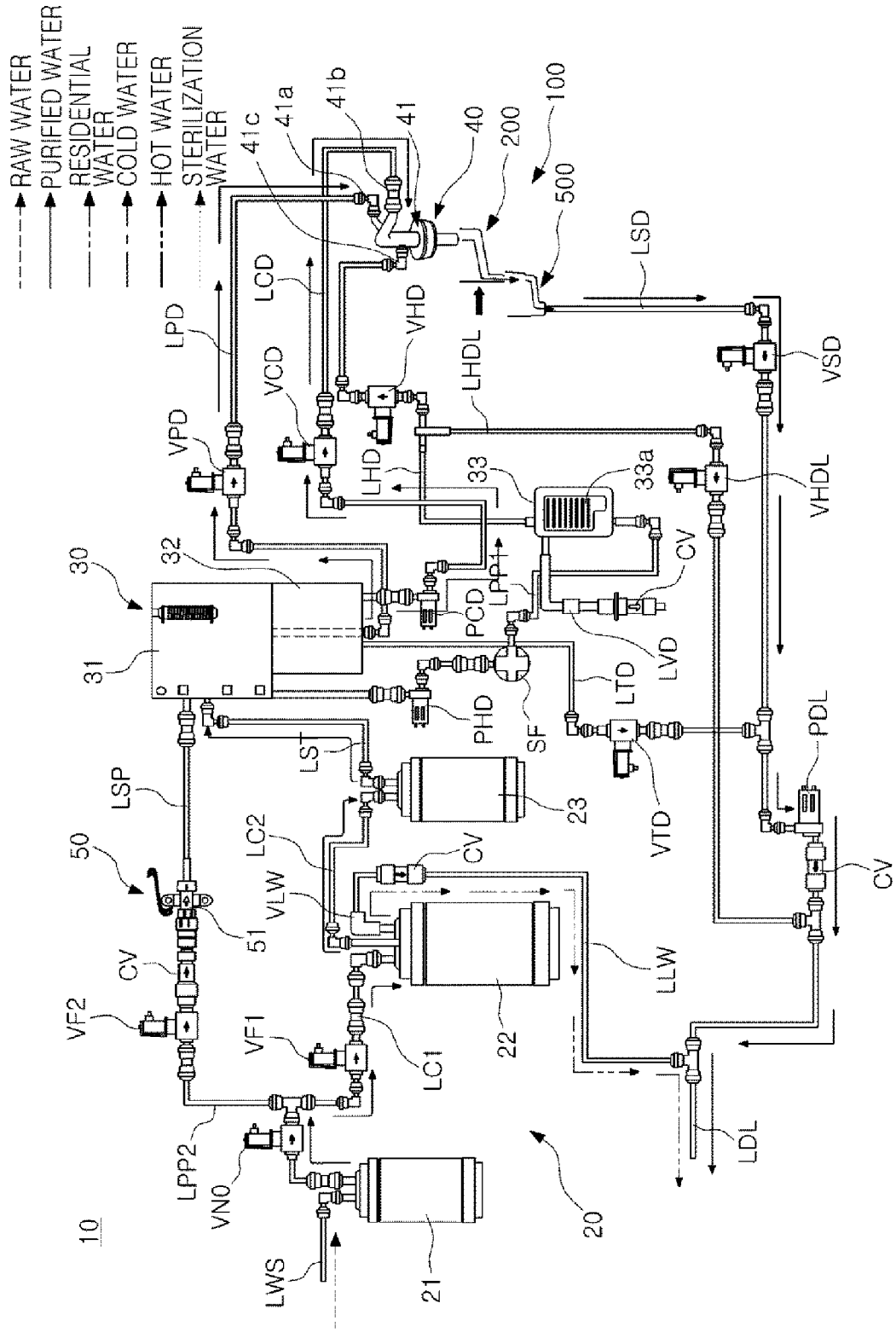
[Figure 11]

STERILIZATION WATER DISCHARGE DEVICE AND WATER TREATMENT DEVICE INCLUDING SAME

PRIORITY

This application is a National Phase Entry of International Application No. PCT/KR2017/004685, which was filed on May 2, 2017, and claims priority to Korean Patent Application No. 10-2016-0053832, which was filed on May 2, 2016, the content of each of which is incorporated herein by reference.

TECHNICAL FIELD

The present disclosure relates to a sterilization water discharge device configured to receive sterilization water discharged from a discharge member, through which water is discharged, and to discharge the received sterilization water externally, and a water treatment device including the same.

BACKGROUND ART

Water treatment devices are devices processing water to supply the processed water to users.

As such water treatment devices, there are provided a water purifier for supplying water to a user by filtering the water, an ionizer for electrolyzing the water into alkaline water or acid water to supply the water to a user, a carbonated water generator for dissolving carbonic acid in water to supply the water to a user, and the like.

On the other hand, when a water treatment device is used for an extended period of time, a storage tank in which water is stored, a tube through which water flows, or the like, may be contaminated by foreign substances, bacteria or the like. As such, when the water treatment device may be contaminated, the water treated in the water treatment device may also be contaminated such that contaminated water may be supplied to a user.

Thus, sterilization water is produced in the related art water treatment device to sterilize the water treatment device periodically or when necessary.

As described above, in the related art, sterilization water, having sterilized the water treatment device, is discharged through a discharge member that discharges treated-water processed by the water treatment device.

Further, a separate drainage container is installed in the discharge member, so that sterilization water discharged from the discharge member may be provided to the drainage container. After the drainage container having the sterilization water therein is separated from the discharge member, the sterilization water stored in the drainage container is discarded.

In this case, since the drainage container should be installed and separated from the discharge member every time the water treatment device is sterilized, it may be inconvenient for a user and the capacity of the drainage container is limited. Thus, the drainage of sterilization water may not be smoothly performed.

DISCLOSURE

Technical Problem

An aspect of the present disclosure is to provide a sterilization water discharge device and a water treatment device by recognizing at least one of the above-mentioned requirements or problems in the related art.

According to an aspect of the present disclosure, sterilization water, having sterilized a water treatment device, may be smoothly drained.

According to another aspect of the present disclosure, the drainage of sterilization water having sterilized a water treatment device may be facilitated.

Technical Solution

A sterilization water discharge device and a water treatment device including the same, according to an exemplary embodiment in the present disclosure, may be characterized as described below.

According to an aspect of the present disclosure, a sterilization water discharge device includes a tray part movably provided below a discharge member through which water is discharged, and configured to receive sterilization water discharged from the discharge member to drain the sterilization water; and a movement driving part configured to move the tray part.

In this case, the tray part may move between a standby position, in which water other than the sterilization water, discharged from the discharge member, is not provided to the tray part, and a sterilization water drainage position, in which the sterilization water, discharged from the discharge member is provided to the tray part.

The tray part may be provided with a sterilization water receiving portion formed therein, the sterilization water receiving portion having an open upper portion through which the sterilization water discharged from the discharge member is provided, and may be provided with a drainage port connected to the sterilization water receiving portion to drain the sterilization water contained in the sterilization water receiving portion.

A bottom of the sterilization water receiving portion may be inclined toward the drainage port.

The sterilization water discharge device may further include a movement guide part positioned below the discharge member and configured to allow the tray part to be movable.

The movement guide part may include a water passage through which water other than sterilization water, discharged from the discharge member, passes and falls, in the standby position of the tray part, and a tray passage through which the tray part passes to move between the standby position and the sterilization water drainage position below the water passage.

The movement guide part may further include a drainage port movement passage through which the drainage port passes and in which the drainage port is positioned and moves by movement of the tray part.

The tray part may include a tray member that is provided with the sterilization water receiving portion and the drainage port; and a moving member in which an insertion portion is provided, into which the tray member is provided, the moving member being movably provided in the movement guide part.

The moving member may be provided with a guide protrusion, and the movement guide part may be provided with a guide groove formed therein into which the guide protrusion is inserted and through which the guide protrusion moves.

The movement guide part may be provided with a position sensor, sensing whether the tray part has moved to the sterilization water drainage position from the standby position.

The movement guide part may be provided with a stopper member that prevents the tray part from moving further in a direction opposite to a direction of the sterilization water drainage position from the standby position.

The sterilization water discharge device may further include a drain tank configured to receive sterilization water drained from the drainage port and to be connected to a sterilization water drain line to drain the sterilization water.

The drain tank may be provided with a sterilization water receiving portion having an open upper portion through which the sterilization water drained from the drainage port is provided, and may be provided with a drain connection port connected to the sterilization water receiving portion and the sterilization water drain line.

The sterilization water drain line may be provided with a drain pump.

The drain tank may be provided with a water level sensor sensing a level of the sterilization water contained in the sterilization water receiving portion.

The movement driving part may include a driving motor; and a gear connected to the driving motor and engaged with a gear portion disposed on the tray part.

According to an aspect of the present disclosure, a water treatment device includes a filtration part including a water filter to filter water supplied from a water supply source; a storage part storing the water filtered by the filtration part; a discharge part including a discharge member externally discharging the water stored in the storage part; a sterilizing part producing sterilization water, using water filtered by at least one water filter in the water filter, to sterilize the storage part and the discharge part with sterilization water; and the sterilization water discharge device.

The discharge member is directly connected to the storage part by a discharge line.

Advantageous Effects

As described above, according to exemplary embodiments in the present disclosure, a tray part may be movably provided below a discharge member from which water is discharged, to receive sterilization water discharged from the discharge member to drain the sterilization water.

In addition, according to an exemplary embodiment, the drainage of sterilization water, having sterilized a water treatment device, may be easily performed.

Further, according to an exemplary embodiment, sterilization water, having sterilized a water treatment device, may be smoothly drained.

DESCRIPTION OF DRAWINGS

FIG. 1 is a perspective view of a sterilization water discharge device according to an exemplary embodiment in the present disclosure.

FIG. 2 is a perspective view of a sterilization water discharge device according to an exemplary embodiment, when viewed in a direction different from that in FIG. 1.

FIG. 3 is an exploded perspective view of FIG. 1.

FIG. 4 is a cross-sectional view taken along line I-I' of FIG. 1.

FIGS. 5 and 6 are cross-sectional views illustrating operations of the sterilization water discharge device as illustrated in FIG. 4, according to an exemplary embodiment in the present disclosure.

FIG. 7 is a view illustrating a water treatment device according to an exemplary embodiment in the present disclosure.

FIGS. 8 to 11 are views illustrating operations of a water treatment device according to an exemplary embodiment in the present disclosure.

MODE FOR INVENTION

Hereinafter, a sterilization water discharge device according to an exemplary embodiment in the present disclosure and a water treatment device including the same will be described in detail to facilitate understanding of the features of the present disclosure.

Exemplary embodiments described below will be described on the basis of embodiments suited to understand the technical characteristics of the present disclosure, and the technical features of the present disclosure are not limited by the embodiments described below. Embodiments described below are provided to implement the invention by way of examples. Therefore, embodiments in the present disclosure may be variously modified within the technical scope of the invention, and the modifications and variations may be provided within the scope of the invention. In order to facilitate understanding of the embodiments described below, in the reference numerals illustrated in the accompanying drawings, the related constituent elements among the constituent elements performing the same function in respective embodiments are indicated by the same or similar reference numerals.

Sterilization Water Discharge Device

Hereinafter, a sterilization water discharge device according to an exemplary embodiment will be described with reference to FIGS. 1 to 6.

FIG. 1 is a perspective view of a sterilization water discharge device according to an exemplary embodiment, and FIG. 2 is a perspective view of a sterilization water discharge device according to an exemplary embodiment, when viewed in a direction different from that illustrated in FIG. 1.

FIG. 3 is an exploded perspective view of FIG. 1, and FIG. 4 is a cross-sectional view taken along line I-I' of FIG. 1.

FIGS. 5 and 6 are cross-sectional views illustrating operations of the sterilization water discharge device as illustrated in FIG. 4, according to an exemplary embodiment.

A sterilization water discharge device 100 according to an exemplary embodiment may include a tray part 200 and a movement driving part 300, as illustrated in FIGS. 1, 3 and 4.

The tray part 200 may be movably provided below a discharge member 41.

Water, having been processed by a water treatment device to be described below, such as a water purifier including the discharge member 41 or the like, may be discharged from the discharge member 41. For example, as illustrated in FIG. 5, purified water or purified cold water filtered by water filters 21, 22 and 23 to be described later, included in the water treatment device 10, may be discharged from the discharge member 41.

As illustrated in FIG. 6, sterilization water, for example, water having been produced in the water treatment device 10 and having sterilized the water treatment device 10, may be discharged from the discharge member 41.

The discharge member 41 may be, for example, a cock or a faucet, but is not particularly limited, and any known discharge member may be used as long as water and sterilization water can be discharged therethrough.

In the case in which the discharge member 41 is included in the water treatment device 10 such as a water purifier or the like, the discharge member 41 may include a purified water connection port 41a connected to a purified water tank 31 included in the water treatment device 10, a cold water connection port 41b connected to a cold water tank 32, and a hot water connection port 41c connected to an instantaneous water heater 33, for example, as illustrated in FIGS. 1 and 3.

In addition, as illustrated in FIG. 2, the discharge member 41 may be provided with a purified cold water outlet 41d connected to the purified water connection port 41a and the cold water connection port 41b, and a hot water outlet 41e connected to the hot water connection port 41c.

Thus, purified water stored in the purified water tank 31 of the water treatment device 10 to be described later may be discharged through the purified water connection port 41a and the purified cold water outlet 41d of the discharge member 41. Further, cold water stored in the cold water tank 32 of the water treatment device 10 to be described later may be discharged through the cold water connection port 41b and the purified cold water outlet 41d of the discharge member 41. Hot water produced by the instantaneous water heater 33 of the water treatment device 10 to be described later may be discharged through the hot water connection port 41c and the hot water outlet 41e of the discharge member 41.

In addition, sterilization water, having been produced by the water treatment device 10 and having sterilized the water treatment device 10, may be discharged through the purified water connection port 41a and the purified cold water outlet 41d, or the cold water connection port 41b and the purified cold water outlet 41d of the discharge member 41.

However, the configuration and the number of the discharge members 41 are not particularly limited, and any configuration and number of discharge members 41 may be employed, as long as water other than sterilization water, such as purified water, cold water, hot water or the like, and sterilization water, as described above, may be discharged thereby.

The tray part 200 may be configured to receive sterilization water discharged from the discharge member 41 and to drain the received sterilization water.

The tray part 200 may be movable between a standby position as illustrated in FIG. 5 and a sterilization water drainage position as illustrated in FIG. 6.

In the standby position, the tray part 200 may not receive water other than sterilization water, discharged from the discharge member 41. For example, purified water, cold water or hot water may not be provided to the tray part in the standby position. Further, in the sterilization water drainage position, the tray part 200 may receive sterilization water discharged from the discharge member 41.

As a result, differently from the related art in which a separate drainage container (not shown) is installed in a discharge member to store sterilization water discharged from the discharge member and the drainage container is then separated from the discharge member to discard the sterilization water stored in the drainage container, sterilization water discharged from the discharge member 41 may be drained by only moving the tray part 200 according to an exemplary embodiment in the present disclosure.

Thus, the drainage of sterilization water having sterilized the water treatment device 10 may be easily performed. In addition, sterilization water having sterilized the water treatment device 10 may be smoothly drained.

The tray part 200 may be provided with a sterilization water receiving portion 211 formed therein, having an open upper portion. Thus, for example, when the tray part 200 is moved to the sterilization water drainage position as illustrated in FIG. 6, sterilization water discharged from the discharge member 41 may be received in the sterilization water receiving portion 211 through the open upper portion of the sterilization water receiving portion 211.

The tray part 200 may include a drainage port 212. The drainage port 212 may be connected to the sterilization water receiving portion 211. Thus, for example, when the tray part 200 is moved to the sterilization water drainage position, the sterilization water discharged from the discharge member 41 to be provided to the sterilization water receiving portion 211 may be drained through the drainage port 212.

The bottom of the sterilization water receiving portion 211 may be inclined toward the drainage port 212 as illustrated in FIG. 4. Thus, as illustrated in FIG. 6, the sterilization water discharged from the discharge member 41 and provided to the sterilization water receiving portion 211 may easily flow into the drainage port 212 from the interior of the sterilization water receiving portion 211.

The tray part 200 may be provided with a gear portion 213 formed thereon. For example, the tray part 200 may be formed with the gear portion 213 that is a rack gear in a length direction. A gear 320 to be described later, included in the movement driving part 300, may be engaged with the gear portion 213. The gear 320 may be, for example, a pinion gear.

Thus, the tray part 200 may be moved between the standby position and the sterilization water drainage position, by rotation of the gear 320 by a driving motor 310 to be described later, included in the movement driving part 300 and connected to the gear 320, as illustrated in FIGS. 5 and 6.

The tray part 200 may be provided with a magnet 214 as illustrated in FIG. 3. Thus, a position sensor 450 included in a movement guide part 400 to be described later may sense the magnet 214, to sense that the tray part 200 has moved to the sterilization water drainage position.

The tray part 200 may include a tray member 210 and a moving member 220.

As illustrated in FIGS. 3 and 4, the tray member 210 may be provided with the sterilization water receiving portion 211 formed therein, and may be provided with the drainage port 212. In addition, the tray member 210 may be provided with the gear portion 213 described above and the magnet 214.

The moving member 220 may be provided with an insertion portion 221 formed therein, into which the tray member 210 may be inserted, as illustrated in FIGS. 3 and 4. The tray member 210 may be combined with the moving member 220, in a state being inserted into the insertion portion 221 of the moving member 220.

The moving member 220 may be movably provided in the movement guide part 400. Thus, as the moving member 220 moves in the movement guide part 400, the tray member 210 may also be moved.

The moving member 220 may be provided with a guide protrusion 222 formed thereon. The guide protrusion 222 may be movably inserted into a guide groove 440 to be described later, formed in the movement guide part 400, and thus, the moving member 220 may be moved in the movement guide part 400.

However, the configuration in which the moving member 220 is movably provided in the movement guide part 400, is not particularly limited, and any configuration known in the art may be applied thereto.

Further, the configuration of the tray part 200 is not particularly limited, and any known configuration may be employed as long as the tray part 200 is configured to be movable below the discharge member 41 and to receive sterilization water discharged from the discharge member 41 to discharge the received sterilization water.

The movement driving part 300 may be configured to move the tray part 200. The movement driving part 300 may include the driving motor 310 and the gear 320 meshing with the gear portion 213, the gear portion 213 being disposed in the tray part 200, for example, provided with the tray member 210 of the tray part 200.

The gear portion 213 of the tray part 200 may be, for example, a rack gear as described above, and the gear 320 may be, for example, a pinion gear. Thus, the tray part 200 may be moved by the rotation of the gear 320 as the driving motor 310 is driven.

However, the configuration of the movement driving part 300 is not particularly limited, and any known configuration may be used as long as the configuration allows the tray part 200 to move.

The sterilization water drainage device 100 according to an exemplary embodiment may further include the movement guide part 400 as illustrated in FIGS. 1 to 4.

The movement guide part 400 may be positioned below the discharge member 41 as illustrated in FIGS. 1, 2 and 4. For example, as illustrated in the drawing, the movement guide part 400 may be installed in a guide-part installation portion 11a formed in a device body 11 included in the water treatment device 10 such as a water purifier or the like, thereby being located below the discharge member 41.

However, the configuration in which the movement guide part 400 is positioned below the discharge member 41 is not particularly limited, and any known configuration may be applied thereto.

The movement guide part 400 may be provided with the tray part 200 provided movably.

The movement guide part 400 may include a water passage 410 and a tray passage 420.

Water, other than sterilization water discharged from the discharge member 41, for example, water such as purified water, cold water or the like, treated by the water treatment device 10, may pass through and fall through the water passage 410, in the standby position of the tray part 200 as illustrated in FIG. 5, so that water other than sterilization water may be supplied to a user.

In addition, the tray part 200 may pass through the tray passage 420 to move between the standby position and the sterilization water drainage position below the water passage 410.

As illustrated in FIGS. 3 and 4, for example, the water passage 410 may be horizontally formed in the movement guide part 400, and the tray passage 420 may be vertically formed in the movement guide part 400. The water passage 410 and the tray passage 420 may be connected to each other.

However, the configuration and shape of the water passage 410 and the tray passage 420 are not particularly limited, and any configuration and shape may be used.

The movement guide part 400 may further include a drainage port movement passage 430. As illustrated in FIG. 4, the drainage port 212 of the tray part 200 may pass through the drainage port movement passage 430. As the tray part 200 moves, the drainage port 212 may be moved in the drainage port movement passage 430.

Thus, the movement of the tray part 200 may be prevented from being disturbed by the drainage port 212.

The guide groove 440 may be formed in the movement guide part 400. The guide protrusion 222 of the tray part 200 described above may be movably inserted into the guide groove 440. For example, as illustrated in FIG. 3, the guide groove 440 may be lengthwise respectively formed in portions of both sides of the movement guide part 400 provided on the drainage port movement passage 430 in a length direction of the movement guide part 400. Thus, the tray part 200 may be moved in the movement guide part 400.

However, the configuration in which the tray part 200 is movably provided in the movement guide part 400 is not particularly limited, and any known configuration may be used.

In the movement guide part 400, a position sensor 450 may be provided to sense whether the tray part 200 has moved from the standby position to the sterilization water drainage position.

For example, the position sensor 450 may be disposed in a portion of the movement guide part 400 to correspond to a position of the sterilization water drainage position of the tray part 200. In addition, the position sensor 450 may sense the magnet 214 provided in the tray part 200. Thus, when the tray part 200 moves to the sterilization water drainage position, the position sensor 450 may sense the magnet 214 of the tray part 200, to detect that the tray part 200 has moved to the sterilization water drainage position.

As such, for example, when the tray part 200 is detected as having moved to the sterilization water drainage position by the position sensor 450, sterilization water may be discharged from the discharge member 41 as illustrated in FIG. 6. Thus, the sterilization water discharged from the discharge member 41 may be provided to the tray part 200 to be drained.

However, the configuration in which the position sensor 450 senses that the tray part 200 has moved to the sterilization water drainage position is not particularly limited, and any known configuration may be employed.

The movement guide part 400 may be provided with a stopper member 460. The stopper member 460 may prevent the tray part 200 from moving further in a direction opposite to that of the sterilization water drainage position, from the standby position.

For example, the stopper member 460 may be provided on a portion of the movement guide part 400, corresponding to the standby position of the tray part 200, and may have the form of a 'ㄷ'. Thus, after the tray part 200 is moved to the standby position by the movement driving part 300, the stopper member 460 may prevent the tray part 200 from moving further in the direction opposite to that of the sterilization water drainage position.

However, the position and the shape of the stopper member 460 are not particularly limited, and any position and shape may be used as long as the tray part 200 may be prevented from moving in a direction opposite to that of the sterilization water drainage position from the standby position, in the position and shape.

As illustrated in FIGS. 1, 3 and 4, the sterilization water discharge device 100 according to an exemplary embodiment may further include a drain tank 500.

As illustrated in FIG. 6, the drain tank 500 may contain sterilization water drained from the drainage port 212 of the tray part 200. Then, the drain tank 500 may be connected to a sterilization water drain line LSD as illustrated in FIG. 7, such that sterilization water may be drained.

The drain tank 500 may be located below the drainage port 212 of the tray part 200. A sterilization water receiving portion 510 may be formed in the drain tank 500, and the sterilization water receiving portion 510 may have an open upper portion through which sterilization water, drained from the drainage port 212, may be provided to the sterilization water receiving portion 510. Further, the drain tank 500 may be provided with a drain connection port 520 connected to the sterilization water receiving portion 510 and the sterilization water drain line LSD.

Thus, as illustrated in FIG. 6, sterilization water discharged from the discharge member 41 and provided to the tray part 200, in the sterilization water drainage position of the tray part 200, may be discharged to the drain tank 500 through the drainage port 212, and may be provided to the sterilization water receiving portion 510 through the open upper portion of the sterilization water receiving portion 510.

In addition, the sterilization water provided to the sterilization water receiving portion 510 of the drain tank 500 may be introduced into the sterilization water drain line LSD through the drain connection port 520, to be drained.

As illustrated in FIG. 7, the sterilization water drain line LSD may be provided with a drain pump PDL. The sterilization water provided to the sterilization water receiving portion 510 of the drain tank 500 may be easily introduced into the sterilization water drain line LSD through the drain connection port 520 to be drained, by driving the drain pump PDL.

The drain tank 500 may be provided with a water level sensor (not shown) to sense the level of sterilization water provided to the sterilization water receiving portion 510. For example, at least one of a water level sensor sensing a low water level of sterilization water, and a water level sensor sensing a full water level of sterilization water may be provided in the drain tank 500.

In addition, the sterilization water may be smoothly drained through the sterilization water drain line LSD, by adjusting driving of the drain pump PDL, depending on the water level of the sterilization water in the sterilization water receiving portion 510 by the water level sensor.

Water Treatment Device

Hereinafter, a water treatment device according to an exemplary embodiment in the present disclosure will be described with reference to FIGS. 7 to 11.

FIG. 7 is a view illustrating a water treatment device according to an exemplary embodiment, and FIGS. 8 to 11 are views illustrating operations of a water treatment device according to an exemplary embodiment.

As illustrated in FIG. 7, a water treatment device 10 according to an exemplary embodiment may include a filtration part 20, a storage part 30, a discharge part 40, a sterilizing part 50, and the sterilization water discharge device 100.

The filtration part 20 may filter water supplied from a water supply source. To this end, the filtration part 20 may include water filters 21, 22 and 23.

The filtration part 20 may be connected to the water supply source (not shown) as a raw water supply source, such as waterworks or the like, by a supply line LWS. Thus, water from the water supply source, for example, raw water, may be supplied to the filtration part 20 through the supply line LWS, as illustrated in FIGS. 8, 10 and 11.

The filtration part 20 may include a pretreatment filter 21, an reverse osmosis filter 22, and a post-treatment filter 23, as water filters 21, 22 and 23 as illustrated in FIG. 7. In this case, the pretreatment filter 21, the reverse osmosis filter 22 and the post-treatment filter 23 may be connected to each other by connection lines LC1 and LC2.

The pretreatment filter 21 may be connected to the water supply source by, for example, the supply line LWS as illustrated in FIG. 7. In addition, the pretreatment filter 21 and the reverse osmosis filter 22 may be connected to each other by a first connection line LC1. The first connection line LC1 may be provided with a normal open valve VNO and a first supply valve VF1.

The reverse osmosis filter 22 and the post-treatment filter 23 may be connected to each other by a second connection line LC2. The reverse osmosis filter 22 may be connected to a residential water line LLW. The residential water line LLW may be connected to a main drain line LDL. In addition, the residential water line LLW may be provided with a residential water valve VLW and a check valve CV.

In this configuration, when the first supply valve VF1 is opened, water supplied from the water supply source to the filtration part 20 may be sequentially filtered through the pretreatment filter 21, the reverse osmosis filter 22 and the post-treatment filter 23, as illustrated in FIGS. 8 and 11.

Water that has not been filtered by the reverse osmosis filter 22, for example, residential water, may be discharged externally through the residential water line LLW and the main drain line LDL.

On the other hand, in an emergency, the normal open valve VNO may be closed to stop the supply of water from the water supply source to the filtration part 20.

The water filtered by the filtration part 20 may be may be stored in the storage part 30.

The storage part 30 may include, for example, a purified water tank 31, a cold water tank 32, and an instantaneous water heater 33 as illustrated in FIG. 7.

The purified water tank 31 may be connected to the filtration part 20, for example, the post-treatment filter 23 of the filtration part 20, by a storage line LST.

The cold water tank 32 may be connected to the purified water tank 31, such that the water stored in the purified water tank 31 may be supplied and stored therein. For example, the purified water tank 31 and the cold water tank 32 may be formed, by dividing one storage tank into portions in such a manner that the divided portions are communicated with each other by a separating member (not shown) formed with a plurality of communication holes (not shown).

On the other hand, the cold water tank 32 may also be comprised of a storage tank, separately from the purified water tank 31, and the cold water tank 32 may be connected to the purified water tank 31 by a connection pipe or the like. In addition, the cold water tank 32 may not be connected to the purified water tank 31 but may be connected to the filtration part 20, separately from the purified water tank 31.

The cold water tank 32 may be provided with a cooling part (not shown) such as an evaporator through which refrigerant flows, or a cooling part such as a thermoelectric module or the like, through which heat is transferred from one side to the other side when power is supplied. Water supplied to and stored in the cooling tank 32 may be cooled by the cooling part to become cold water.

The cold water tank 32 may be connected to a tank drain line LTD connected to the sterilization water drain line LSD that is connected to the main drain line LDL. The tank drain line LTD may be provided with a tank drain valve VTD.

For example, when the tank drain valve VTD is opened, the water stored in the cold water tank 32 and the purified water tank 31, for example, purified water and cold water, may be discharged externally through the tank drain line LTD, the sterilization water drain line LSD and the main drain line LDL, as illustrated in FIG. 9.

For example, the cold water and the purified water stored in the cold water tank 32 and the purified water tank 31, respectively, may be drained externally to a low water level of the purified water tank 31, through the tank drain line LTD, the sterilization water drain line LSD and the main drain line LDL. However, a drainage amount of water stored in the cold water tank 32 and the purified water tank 31 is not particularly limited.

In this case, when the drain pump PDL provided on the sterilization water drain line LSD is driven, the drainage of water of the cold water tank 32 and the purified water tank 31 may be smoothly performed.

The instantaneous water heater 33 may be connected to the purified water tank 31 by a first purified water supply line LPP1. The first purified water supply line LPP1 may be provided with a hot water discharge pump PHD and a flow rate sensor SF. In this case, for example, when the hot water discharge pump PHD is driven, water stored in the purified water tank 31, for example, purified water, may be supplied to the instantaneous water heater 33 through the first purified water supply line LPP1, as illustrated in FIG. 8.

The instantaneous water heater 33 may include a heater 33a. Thus, the water supplied to the instantaneous water heater 33, for example, the purified water, may be heated by the heater 33a while flowing within the instantaneous water heater 33, thereby becoming hot water. The heater 33a may be, for example, a sheet-type heater. However, the heater 33a is not particularly limited, and any known device may be used as long as it can generate hot water by heating the water supplied to the instantaneous water heater 33.

A steam discharge line LVD, which is provided with the check valve CV, may be connected to the instantaneous water heater 33. Steam generated when the water supplied to the instantaneous water heater 33 is heated by the heater 33a as described above may be externally discharged through the steam discharge line LVD.

The discharge part 40 may discharge the water stored in the storage part 30 externally. To this end, the discharge part 40 may include the discharge member 41 connected to the storage part 30.

The purified water connection port 41a may be provided in the discharge member 41. In addition, the purified cold water outlet 41d connected to the purified water connection port 41a as described above and illustrated in FIG. 2 may be provided in the discharge member 41. The purified water connection portion 41a may be connected directly to the purified water tank 31 by a purified water discharge line LPD. Further, the purified water discharge line LPD may be provided with a purified water discharge valve VPD.

Thus, for example, when the purified water discharge valve VPD is opened, the water stored in the purified water tank 31, for example, the purified water, may be discharged externally through the purified water discharge line LPD, the water connection portion 41a of the discharge member 41, and the purified cold water outlet 41d, as illustrated in FIG. 8, to be supplied to a user.

In this case, since the tray part 200 of the sterilization water discharge device 100 according to an exemplary embodiment is in the standby position as illustrated in FIG. 8, purified water may be discharged through the discharge member 41 without interference.

The discharge member 41 may also be provided with the cold water connection port 41b. The cold water connection port 41b may be connected to the purified cold water outlet 41d. The cold water connection port 41b may be directly connected to the cold water tank 32 by the cold water discharge line LCD. In addition, the cold water discharge line LCD may be provided with a cold water discharge valve VCD. The cold water discharge line LCD may also be provided with a cold water discharge pump PCD.

Thus, for example, when the cold water discharge valve VCD is opened and the cold water discharge pump PCD is driven, water stored in the cold water tank 32, for example, cold water, may be discharged through the cold water discharge line LCD, the cold water connection portion 41b of the discharge member 41, and the purified cold water outlet 41d, externally, as illustrated in FIG. 8.

In this case, as described above, since the tray part 200 of the sterilization water discharge device 100 according to an exemplary embodiment is in the standby position, cold water may be discharged through the discharge member 41 without interference.

The discharge member 41 may also be provided with the hot water connection port 41c. In addition, the discharge member 41 may be provided with the hot water outlet 41e formed therein, connected to the hot water connection port 41c as described above and illustrated in FIG. 2. The hot water connection port 41c may be directly connected to the instantaneous water heater 33 by a hot water discharge line LHD. Further, the hot water discharge line LHD may be provided with a hot water discharge valve VHD.

Thus, for example, when the hot water discharge valve VHD is opened, water produced by the instantaneous water heater 33, for example, hot water, may be discharged externally through the hot water discharge line LHD, the hot water connection port 41c of the discharge member 41, and the hot water outlet 41e, to be supplied to a user, as illustrated in FIG. 8.

In this case, since the tray part 200 of the sterilization water discharge device 100 according to the exemplary embodiment described above is in the standby position as illustrated in FIG. 8, hot water may be discharged through the discharge member 41 without interference.

The hot water discharge line LHD may be connected to a hot water drain line LHDL connected to the sterilization water drain line LSD. The hot water drain line LHDL may be provided with a hot water drain valve VHDL.

Thus, before the hot water produced in the instantaneous water heater 33 is discharged through the hot water discharge line LHD and the discharge member 41, the hot water drain valve VHDL may be opened to allow, hot water having a relatively low temperature in the hot water discharge line LHD, to be externally discharged through the hot water drain line LHDL, the sterilization water drain line LSD and the main drain line LDL.

Thus, at the beginning of the discharge of hot water through the discharge member 41, the relatively low temperature water in the hot water discharge line LHD may be prevented from being discharged through the discharge member 41, thereby allowing hot water, heated by the instantaneous heater 33, to have a predetermined temperature, to be discharged externally through the discharge member 41 from the beginning of discharge, and to be supplied to a user.

In the sterilizing part 50, sterilization water may be produced from water, for example, purified water, having been filtered by at least one of the water filters 21, 22 and 23 of the filtration part 20, to sterilize the storage part 30 and the discharge part 40.

The sterilizing part 50 may, for example, produce sterilization water with water having been filtered by the pretreatment filter 21, for example, with purified water, as illustrated above with reference to FIG. 10. The sterilizing part 50 may make sterilization water from water filtered by the pretreatment filter 21 and the reverse osmosis filter 22. Sterilization water may be produced using water filtered by any water filter 21, 22 or 23 included in the filtration part 20.

The sterilizing part 50 may be connected to a first connection line LC1, connecting the pretreatment filter 21 and the reverse osmosis filter 22 to each other, by a second purified water supply line LPP2. The second purified water supply line LPP2 may be provided with a second supply valve VF2 and the check valve CV. Thus, for example, when the second supply valve VF2 is opened, water supplied from the water supply source and filtered by the pretreatment filter 21, for example, the purified water, may be supplied to the sterilizing part 50, as illustrated in FIG. 10.

The sterilizing part 50 may include a sterilization water producing unit 51. The sterilization water producing unit 51 may be connected to the second purified water supply line LPP2 to receive water filtered by the pretreatment filter 21, for example, purified water. Then, the sterilization water producing unit 51 may be configured to electrolyze the received purified water to produce sterilization water.

However, the sterilization water producing unit 51 is not particularly limited, and any known structure may be used as long as the sterilization water producing unit 51 may dissolve a sterilizing material in the received purified water to produce sterilization water.

The sterilization water producing unit 51 of the sterilizing part 50 may be connected to the storage tank 30, for example, the purified water tank 31 of the storage part 30, by the sterilization water supply line LSP. Thus, the sterilization water produced in the sterilization water producing unit 51 may be supplied to the purified water tank 31 of the storage part 30 as illustrated in FIG. 10.

As such, the sterilization water supplied to the purified water tank 31 of the storage part 30 may also be supplied to the cold water tank 32 of the storage part 30. The purified water tank 31 and the cold water tank 32 of the storage part 30 may be sterilized by sterilization water.

In this case, the tray part 200 of the sterilization water discharge device 100 according to an exemplary embodiment may move to the sterilization water drainage position as illustrated in FIG. 10.

In addition, when the tray part 200 is sensed as having moved to the sterilization water drainage position by the position sensor 450 described above, the purified water discharge valve VPD and the cold water discharge valve VCD may be opened simultaneously or sequentially.

Thus, the sterilization water, having sterilized the purified water tank 31 and the cold water tank 32, may flow through the purified water discharge line LPD, the cold water discharge line LCD and the discharge member 41 of the discharge part 40 as illustrated in FIG. 10, to sterilize the discharge lines LPD and LCD connecting the storage part 30 and the discharge member 41 of the discharge part 40 to each other, and the discharge part 40.

As such, the sterilization water, having sterilized the discharge lines LPD and LCD and the discharge part 40, may be discharged from the discharge member 41 to be provided to the tray part 200 of the sterilization water discharge device 100 and then flow into the drain tank 500 as illustrated in FIG. 10.

For example, when the sterilization water drain valve VSD provided on the sterilization water drain line LSD is opened to drive the drain pump PDL, sterilization water provided to the drain tank 500 may be externally discharged through the sterilization water drain line LSD and the main drain line LDL as illustrated in FIG. 10.

As described above, after sterilizing the storage part 30 and the discharge part 40 by the sterilization water, the water of the water supply source may be supplied to the filtration part 20 as illustrated in FIG. 11, to rinse the storage part 30 and the discharge part 40 with the water filtered by the filtration part 20.

In this case, the tray part 200 of the sterilization water discharge device 100 according to an exemplary embodiment may be in the sterilization water drainage position as illustrated in FIG. 11.

Thus, the water having rinsed the storage part 30 and the discharge part 40 may be externally drained through the tray part 200, the drain tank 500, the sterilization water drain line LSD, and the main drain line LDL, as illustrated in FIG. 11.

Since the sterilization water discharge device 100 has been described above, the description thereof may be replaced with the foregoing description.

As described above, the sterilization water discharge device according to an exemplary embodiment and the water treatment device including the same may be used. In this case, the tray part may be movably provided below the discharge member through which water is discharged, in such a manner that sterilization water discharged from the discharge member may be inserted thereinto to be drained. Thus, the drainage of sterilization water, having sterilized the water treatment device, may be easily performed, and the sterilization water, having sterilized the water treatment device, may be smoothly drained.

The sterilization water discharge device and the water treatment device including the same are not limited to the configurations of the exemplary embodiments described above, and the embodiments may also be variously modified by selectively combining all or some of the embodiments.

The invention claimed is:

1. A sterilization water discharge device comprising:
a tray part movably provided below a discharge member through which water is discharged, and configured to receive sterilization water discharged from the discharge member to drain the sterilization water; and
a movement driving part configured to move the tray part, wherein the tray part moves between a standby position, in which water other than the sterilization water, discharged from the discharge member, is not provided to the tray part, and a sterilization water drainage position, in which the sterilization water, discharged from the discharge member is provided to the tray part,
further comprising a movement guide part positioned below the discharge member and configured to allow the tray part to be movable, and
the movement guide part comprises a water passage through which water other than sterilization water, discharged from the discharge member, passes and falls, in the standby position of the tray part, and a tray passage through which the tray part passes to move between the standby position and the sterilization water drainage position below the water passage.

2. The sterilization water discharge device of claim 1, wherein the tray part is provided with a sterilization water receiving portion formed therein, the sterilization water receiving portion having an open upper portion through which the sterilization water discharged from the discharge member is provided, and is provided with a drainage port connected to the sterilization water receiving portion to drain the sterilization water contained in the sterilization water receiving portion.

3. The sterilization water discharge device of claim 2, wherein a bottom of the sterilization water receiving portion is inclined toward the drainage port.

4. The sterilization water discharge device of claim 2, wherein the movement guide part further comprises a drainage port movement passage through which the drainage port passes and in which the drainage port is positioned and moves by movement of the tray part.

5. The sterilization water discharge device of claim 2, wherein the tray part comprises:
   a tray member that is provided with the sterilization water receiving portion and the drainage port; and
   a moving member in which an insertion portion is provided, into which the tray member is inserted, the moving member being movably provided in the movement guide part.

6. The sterilization water discharge device of claim 5, wherein the moving member is provided with a guide protrusion, and the movement guide part is provided with a guide groove formed therein into which the guide protrusion is inserted and through which the guide protrusion moves.

7. A sterilization water discharge device of claim 5, comprising:
   a tray part movably provided below a discharge member through which water is discharged, and configured to receive sterilization water discharged from the discharge member to drain the sterilization water, and
   a movement driving part configured to move the tray part,
   wherein the tray part moves between a standby position, in which water other than the sterilization water, discharged from the discharge member, is not provided to the tray part, and a sterilization water drainage position, in which the sterilization water, discharged from the discharge member is provided to the tray part,
   further comprising a movement guide part positioned below the discharge member and configured to allow the tray part to be movable, and
   the movement guide part is provided with a position sensor sensing whether the tray part has moved to the sterilization water drainage position from the standby position.

8. The sterilization water discharge device of claim 1, wherein the movement guide part is provided with a stopper member that prevents the tray part from moving further in a direction opposite to a direction of the sterilization water drainage position from the standby position.

9. The sterilization water discharge device of claim 2, further comprising a drain tank configured to receive sterilization water drained from the drainage port and to be connected to a sterilization water drain line to drain the sterilization water.

10. The sterilization water discharge device of claim 9, wherein the drain tank is provided with a sterilization water receiving portion having an open upper portion through which the sterilization water drained from the drainage port is provided, and is provided with a drain connection port connected to the sterilization water receiving portion and the sterilization water drain line.

11. The sterilization water discharge device of claim 9, wherein the sterilization water drain line is provided with a drain pump.

12. The sterilization water discharge device of claim 9, wherein the drain tank is provided with a water level sensor sensing a level of the sterilization water contained in the sterilization water receiving portion.

13. The sterilization water discharge device of claim 1, wherein the movement driving part comprises:
   a driving motor; and
   a gear connected to the driving motor and engaged with a gear portion disposed on the tray part.

14. A water treatment device comprising:
   a filtration part including a water filter to filter water supplied from a water supply source;
   a storage part storing the water filtered by the filtration part;
   a discharge part including a discharge member externally discharging the water stored in the storage part;
   a sterilizing part producing sterilization water, using water filtered by at least one water filter in the water filter, to sterilize the storage part and the discharge part with sterilization water; and
   the sterilization water discharge device according to claim 1.

15. The water treatment device of claim 14, wherein the discharge member is directly connected to the storage part by a discharge line.

* * * * *